United States Patent [19]

Lane, Jr.

[11] Patent Number: 5,704,638

[45] Date of Patent: Jan. 6, 1998

[54] INTEGRATED SIDE IMPACT INFLATOR AND MODULE WITH SEAT BELT PRETENSIONING CAPABILITY

[75] Inventor: Wendell Lane, Jr., Romeo, Mich.

[73] Assignee: AlliedSignal Inc., Morristown, N.J.

[21] Appl. No.: 574,175

[22] Filed: Dec. 18, 1995

[51] Int. Cl.⁶ .................... B60R 21/22; B60R 22/46
[52] U.S. Cl. .................. 280/730.2; 280/806
[58] Field of Search ................. 280/806, 730.1, 280/730.2, 733, 741, 736

[56] References Cited

U.S. PATENT DOCUMENTS

| | | | |
|---|---|---|---|
| 4,615,540 | 10/1986 | Sedlmayr et al. | 280/806 |
| 5,112,079 | 5/1992 | Haland et al. | 280/730.2 |
| 5,295,714 | 3/1994 | Fohl . | |
| 5,338,065 | 8/1994 | Fohl . | |
| 5,445,411 | 8/1995 | Kamiyama et al. | 280/733 |
| 5,531,479 | 7/1996 | Bauer | 280/806 |
| 5,588,677 | 12/1996 | Kopetzky et al. | 280/806 |

FOREIGN PATENT DOCUMENTS

| | | |
|---|---|---|
| 0 148 747 | 7/1985 | European Pat. Off. . |
| 0 480 137 A | 4/1992 | European Pat. Off. . |
| 0 540 922 A | 5/1993 | European Pat. Off. . |
| 2 444 473 | 7/1980 | France . |
| 3718117 | 12/1988 | Germany ........................ 280/806 |
| 2 157 152 | 10/1985 | United Kingdom . |
| WO95/19899 | 7/1995 | WIPO . |

*Primary Examiner*—Paul N. Dickson
*Attorney, Agent, or Firm*—Markell Seitzman

[57] ABSTRACT

An integrated inflator/air bag/belt tightening system in which some of the inflation gas generated by an inflator (72) is channeled to a piston casing (90) and used to urge a piston (96) downwardly, the motion of the piston moves a seat belt clamping device with the seat belt clamped therebetween to reduce slack about an occupant.

13 Claims, 3 Drawing Sheets

INTEGRATED SIDE IMPACT INFLATOR AND MODULE WITH SEAT BELT PRETENSIONING CAPABILITY

BACKGROUND AND SUMMARY OF THE INVENTION

The present invention relates to vehicle safety apparatus and more particularly a device that inflates an air bag while simultaneously providing energy to tighten a seat belt about an occupant.

Many of today's automotive vehicles are replete with a variety of safety apparatus such as frontal driver and passenger air bags, side impact air bags, seat belts and seat belt pretensioners. Each of these devices work independently of each other, and as one would expect, are constructed and installed separately. The present invention combines an air bag such as a side impact air bag and a pretensioner or belt tightener. The obvious benefit of this type of arrangement is the reduction in the packaging space requirements and of course the reduction in the overall system cost.

It is an object of the present invention to provide an integrated air bag/pretensioning device. Accordingly the invention comprises: an integrated air bag and seat belt system comprising: a tubular support located within the back of a seat which also has a seat cushion at a lower portion thereof, a seat belt guide near the upper end of the support proximate an exit opening in the top of the seat back. The system further includes a seat belt winding device having a seat belt wound thereon and extending through the support and about the seat belt guide and through the exit opening in the seat back. A web clamp within the support including a wedge housing and a plurality of opposing wedges movable together in response to motion relative to the housing. The wedges are initially fixedly linked via a frangible member to the support and the wedge housing positioned about the wedges. The wedge housing is slidably mounted within the support and slidably positioned about the wedges to provide a limited relative movement therebetween causing the wedges to move together into a seat belt clamping orientation, and thereafter to cause the wedges and clamped seat belt to move with the wedge housing after the frangible member is broken; the edge housing is initially mounted at a first position within the support and movable to a second position. Locking means are provided for preventing the web clamp from moving from the second position. The system also includes an air bag module comprising an inflator, and an air bag, the inflator providing inflation gas to inflate the air bag to protect the occupant and piston means operably connected to wedge housing to move the wedge housing and clamped seat belt from the first position to the second position in response to inflation gas communicated thereto.

Many other objects and purposes of the invention will be clear from the following detailed description of the drawings.

DETAILED DESCRIPTION OF THE DRAWINGS

Figure 1:
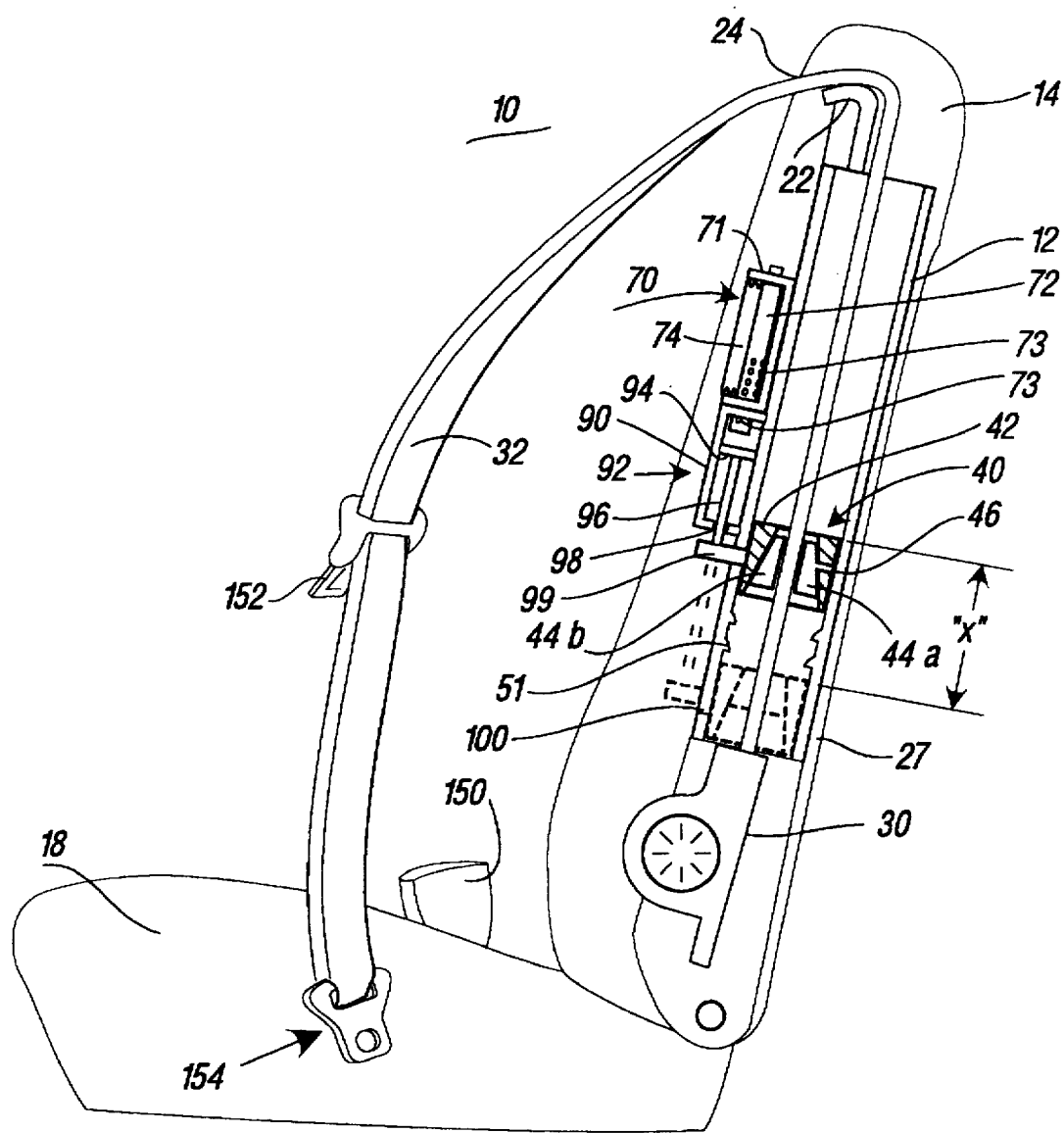
FIG. 1 illustrates a side cross-sectional view of the present invention.
Figure 2:
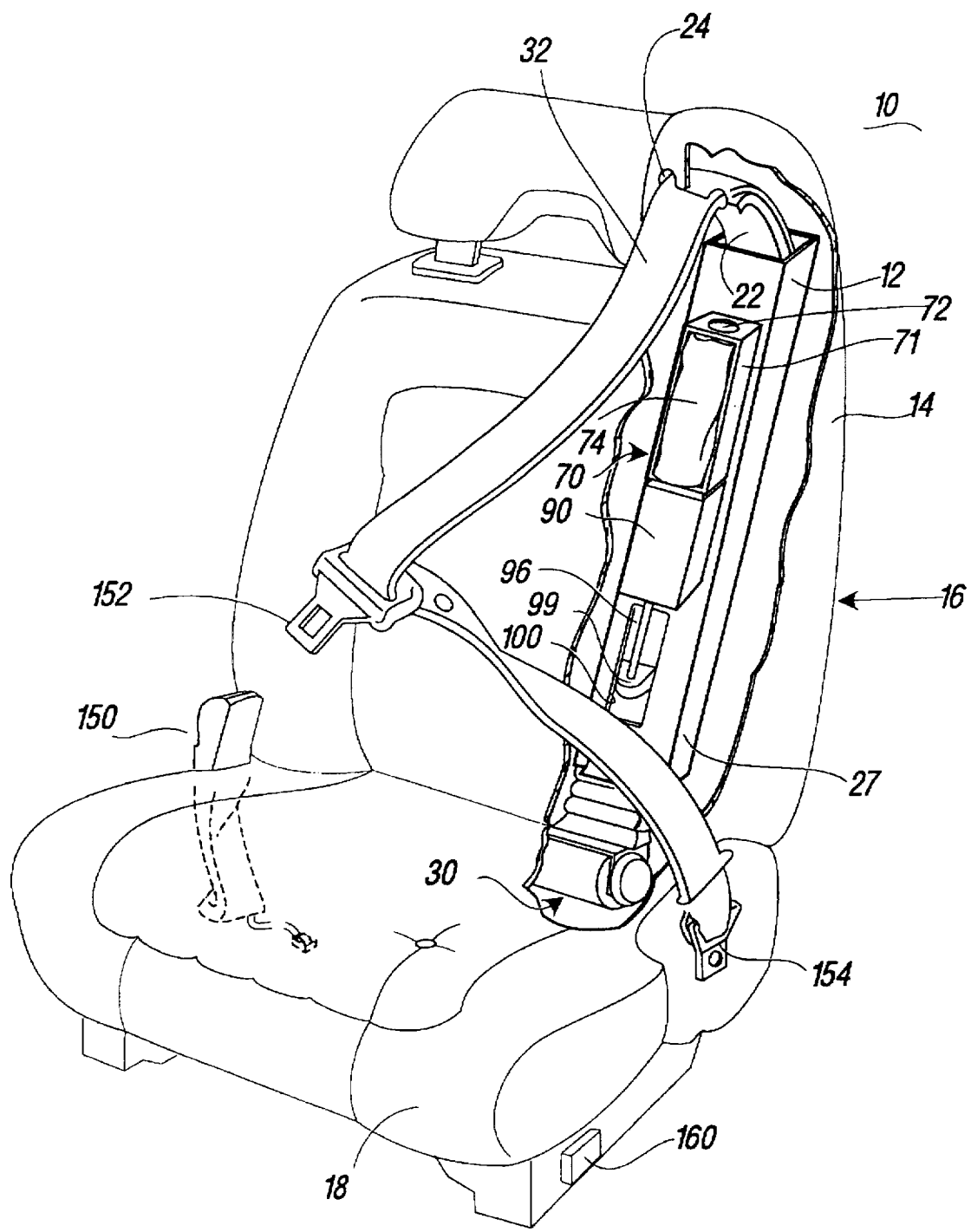
FIG. 2 illustrates a partial, projected view of the present invention.

Reference is made to FIGS. 1 and 2 which illustrate an integrated inflator/air bag/belt tightening apparatus or system 10 which comprises a tubular support 12 located within the back 14 of a seat 16. The seat also includes a seat cushion portion 18. The tubular support may be a part of the internal support structure of the automotive seat 16. While the preferred embodiment of the invention places the system 10 within the seat 16, those skilled in the art will appreciate that the system can be installed with a side or B-pillar of the vehicle. In this scenario the tubular support will be provided by a tubular B-pillar. Situated near the top of the hollow support 12 is a belt guide 22 which guides the seat belt 32 through an exit opening 24 near the top of the seat back 14. Positioned near the lower end 27 of the tubular support is a winding device 30 comprising at a minimum a spool to receive the seat belt and a rewind spring or electric motor to rewind the seat belt (webbing) 32. In the preferred embodiment of the invention the winding device 30 is an emergency locking retractor (ELR) or an automatic locking retractor (ALR) of known variety. As is known in the art, an ELR retractor includes a plurality of sensors, typically a web and a vehicle sensor to initiate lockup of the webbing or spool during an emergency to prevent protraction of the seat belt. An ALR retractor includes known means which cause this type of retractor to be in a continuously locked mode of operation after a predetermined amount of webbing has been protracted from the spool.

Positioned within the tubular support 12, above the winding device 30, is a web clamping apparatus 40. As can be seen, the seat belt or seat belt webbing 32 extends from the winding device 30, through a web clamp apparatus 40, through the support 12, about the web guide 22, and exits the seat through the opening 24.

Figure 3:
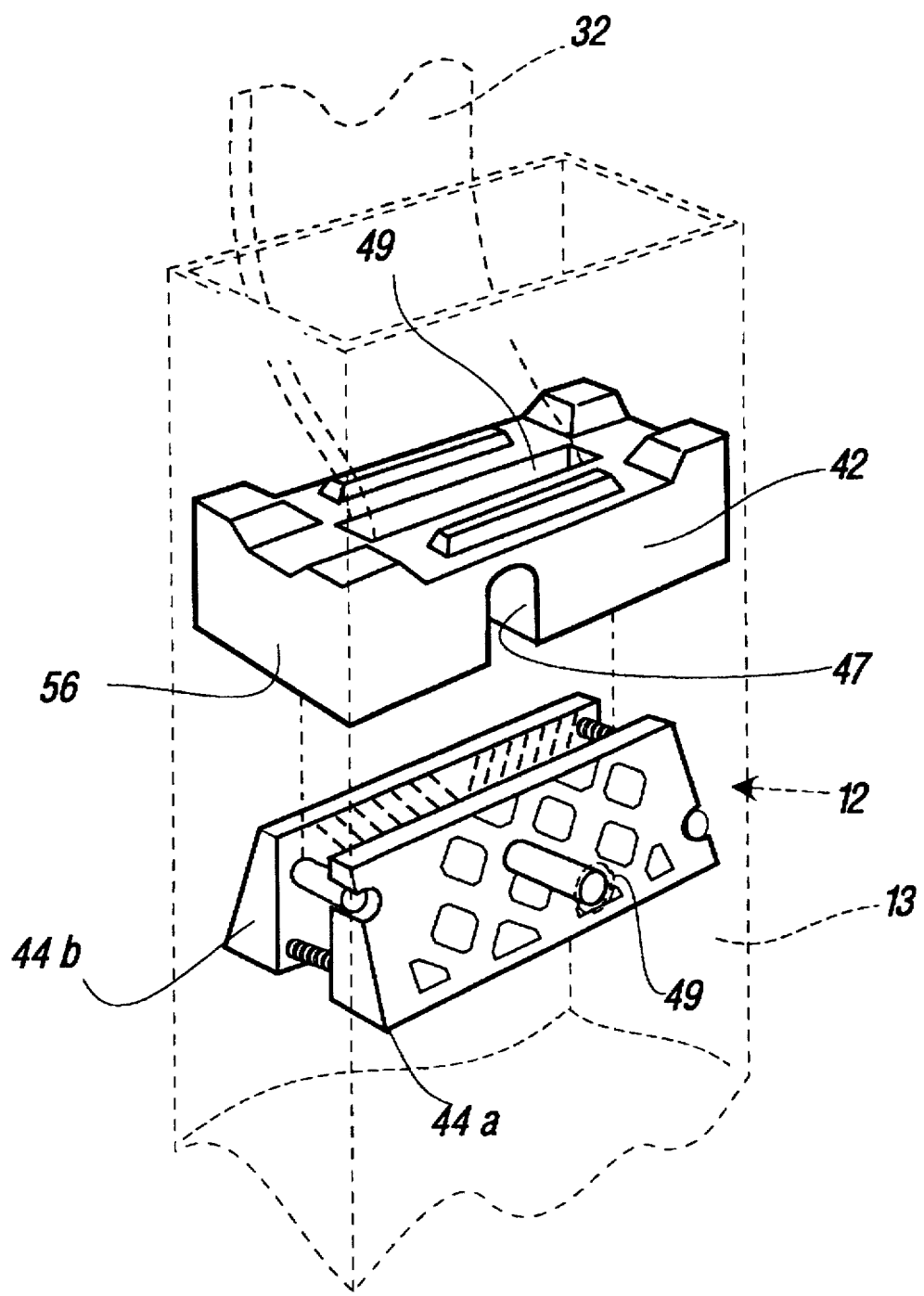
FIG. 3 shows a web clamp apparatus.

The web clamp member 40, is shown in greater detail in FIG. 3, and comprises a housing 42 and a plurality of opposing wedges 44a,b positioned in the housing 42. The support 12 is shown in phantom line in FIG. 3. One similar web clamp is shown in U.S. Pat. No. 4,437,623 to Wyder. The opposing clamping surfaces of each wedge may include a plurality of individual teeth to enhance contact with the seat belt 32. As can be seen from the figures the web clamp apparatus 40 is temporarily secured to the walls 13 of the tubular member 12. This securement is accomplished by using a frangible pin 46. As can be seen in FIG. 3, the frangible pin 46 extends from at least one of the wedges. The pin 46 is received through a slot 47 in an adjacent part of the wedge housing 42 and is fixedly received through a hole 49 in a wall 13 of the tubular support 12. This configuration cantilevers the housing and wedges 44a,b inside the tubular support 12. If a second pin is needed it would extend from the other wedge and be received in an opposing side of the tubular support 12. As will be seen from the description below the housing 42 slides with the tubular support 12. As such, the outer walls 56 of the wedge housing 42 are sized to permit the wedge housing to slide within the support 12.

As is known in the art if the wedges move relative to the wedge housing the spacing between the wedges reduces thereby clamping the seat belt 32 therebetween. In the present invention the wedges 44 will be temporarily held in a fixed position by one or more pins 46 and the housing moved. The continued application of a substantial force on the housing will break the pin 46 permitting the downward movement of the housing 42, wedges 44a,b, and clamped seat belt (or webbing) 32.

Situated near the bottom 27 of the support 12 are a plurality of serrated teeth 51, typically formed from bending a portion of the support walls 13 inwardly. A purpose Of these teeth 51 is to lock the web clamp 40 in place after it has been forcibly repositioned near the bottom of the support.

Also situated within the seat back is an air bag module generally shown as 70. The module comprises an open sided housing or manifold 71, an inflator 72 and an air bag 74 mounted to receive the inflation gas provided by the inflator. Positioned below the housing or manifold 71 is a piston casing 90. The housing 71 is mounted to the support 12 near the outside of the seat back 14 so that upon inflation the air bag 74 will be positioned between an adjacent side of the vehicle and the occupant to provide protection during a side impact. As is known in the art inflators 72 include a number of exit ports 76 to distribute the inflation gas as uniformly as possible into the air bag 74. In the present invention the inflator 72 and manifold cooperate to permit one or more gas exit ports 76 to communicate pressurized inflation gas into the piston casing 90. The piston casing 90 is part of a piston device 92 which also includes a movable piston 94. As needed the piston 94 can include any of a variety of pneumatic seals to prevent inflation gas from flowing between the piston and the wall of the piston casing 90. A piston rod 96 extends from the piston 94 through an opening 98 in the other end of the piston casing 90. A flange 99 extends from the piston rod 96 and is received within a slot 100 within a side wall 13 of the support. This flange 100 is operatively connected to the wedge housing 42.

As illustrated in FIG. 2 a seat belt buckle 150 is positioned on the inboard side of the seat 14. A coacting tongue 152 is slidably positioned along the seat belt 32. An end of the seat belt is fixedly secured such as through an anchor 154 to the seat or to the vehicle's floor. As can be appreciated by one skilled in the art, this type of construction provides for a 3-point restraint system.

During the normal operation of this seat belt, the winding device, i.e. a retractor 30, will lock when the vehicle's deceleration exceeds a lower limit value, typically of about 0.45 to 0.47 g's or when the rate of web extraction typically exceeds 1.5–3.0 g's. During a severe emergency, a crash sensor generally denoted as 160 will generate an emergency signal to cause the inflator to ignite. The inflator 72 simultaneously provides inflation gas to inflate the air bag 74 and to cause the piston 94 to move down its casing 90. As the air bag inflates, it will be positioned between the occupant and the adjacent vehicle side to protect the occupant. As the piston 94 moves within its casing, the wedge housing 48, attached to the piston via the flange 100 and piston rod 96, begins to slide down the interior of the support 12. As the wedge housing 44 moves relative to the fixed wedges 44, the wedges slide on sloped surfaces 49 within the wedge housing thereby causing the wedges to move inwardly into a clamping relationship with the seat belt 32. The further buildup of pressure above the piston 90 forces wedge housing 42 against the frangible pin 46 which breaks or shears off permitting the wedge housing 42 and wedges 44a,b to move down the tube with the seat belt clamped therebetween. As can be seen the housing 42 and wedges 44a,b move down the tube from its initial position to a second position determined by the stroke "x" of the piston. Typically this stroke will be approximately 120–250 mm. The locking teeth 51 formed near the end or bottom 27 of the support member 12 capture the housing 42 to ensure that the wedge housing 42 will not move upwardly within support 12 after the belt 32 has been tightened.

Many changes and modifications in the above described embodiment of the invention can, of course, be carried out without departing from the scope thereof. Accordingly, that scope is intended to be limited only by the scope of the appended claims.

I claim:

1. An integrated air bag and seat belt system comprising:

a tubular support (12);

a seat belt extending through the support, the seat belt adapted to be secured about an occupant;

a seat belt winding device (30) having a seat belt (32) wound thereon and extending through the support (12) and about a seat belt guide (22) located near the top of the support;

a web clamp means (40), movable within the support (12) from a first position to a second position for clamping upon the seat belt, locking means (51) for preventing the web clamp means (40) from moving from the second position, piston means (90, 92, 96, 98) operably connected to the web clamp means for moving the web clamp means and clamped seat belt (32) from the first position to the second position in response to inflation gas communicated thereto; including an air bag module (70) comprising an inflator (72) for generating the inflation gas, and an air bag (74), the inflator (72) providing inflation gas to inflate the air bag to protect the occupant, and housing means for diverting some of the inflation gas to the piston means.

2. The device as defined in claim 1 wherein the web clamp means includes a wedge housing (42) and a plurality of opposing wedges (44a,b) movable together in response to motion relative to the housing, the wedges initially fixedly linked via a frangible member (46) to the support (12), the wedge housing slidably mounted within the support (12) and slidably positioned about the wedges to provide for a limited relative movement therebetween causing the wedges to move together into a seat belt clamping orientation, and wherein the piston means is connected to the wedge housing to cause the wedges and clamped seat belt to move with the wedge housing after the frangible member is broken; the wedge housing (42) initially mounted at the first position within the support (12) and movable to the second position.

3. The system as defined in claim 1 wherein the piston means (80) is movable within a piston casing (90), the casing having an inlet in communication with the inflator (72) to receive inflation gas therefrom.

4. The device as defined in claim 3 wherein the piston casing (90) and the inflator (72) are joined.

5. The device as defined in claim 3 wherein the piston (94) includes a rod (96) extending through a rod opening (98) in the casing (90) joined to the wedge housing (42).

6. The device as defined in claim 1 wherein the winding device (30) is an emergency locking seat belt retractor.

7. An integrated air bag and seat belt system comprising:

web clamp means for clamping a seat belt thereto;

a seat belt winding device having a portion of the seat belt wound thereon, a second portion of the seat belt extending about a seat belt guide located remote from the winding device and received within the web clamp means;

moving means operably connected to the web clamp means for moving the web clamp means and the clamped seat belt in a direction and to a tightening position that would cause the seat belt to tighten about an occupant in response to inflation gas communicated thereto;

an air bag inflator for generating the inflation gas, and an air bag mounted to receive and be inflated by the inflation gas to protect the occupant, and first means for diverting a portion of the inflation gas to the moving means.

8. The device as defined in claim 7 including locking means for temporarily keeping the web clamp means in the tightening position.

9. An integrated air bag and seat belt system (10) comprising:

an air bag inflator for generating inflation gas, and an air bag mounted to receive and be inflated by the inflation gas to protect an occupant;

web clamp means movable to a position to clamp a seat belt thereto;

a seat belt winding device having the seat belt wound thereon; the seat belt extending through the web clamp means and clamped by the web clamp means, the seat belt adapted to be secured about an occupant;

moving means communicated to the inflator to receive the inflation gas and operably connected to the web clamp means for moving the web clamp means, and the seat belt clamped thereto, in a direction and to a tightened position to tighten a portion of the seat belt about the occupant in response to the air bag inflation gas.

10. The device as defined in claim 8 including first means for maintaining the web clamp means in the tightened position.

11. The system as defined in claim 9 wherein the moving means includes a movable piston movable within a piston casing, the casing having an inlet in communication with the inflator to receive inflation gas therefrom.

12. The device as defined in claim 11 wherein the piston casing and the inflator are joined.

13. The device as defined in claim 11 wherein the piston includes a rod extending through a rod opening in the casing joined to a wedge housing of the web clamp means.

* * * * *